United States Patent [19]
Childs-Goodrich et al.

[11] Patent Number: 5,386,454
[45] Date of Patent: Jan. 31, 1995

[54] REMOTELY CONTROLLED MULTIPLE PAIR TELEPHONE PEDESTAL/BUILDING TERMINAL

[75] Inventors: Whitney E. Childs-Goodrich, Louisville; William S. Stevens, Berthoud, both of Colo.

[73] Assignee: Remote Switch Systems, Inc., Loveland, Colo.

[21] Appl. No.: 108,972

[22] Filed: Aug. 18, 1993

[51] Int. Cl.⁶ .................. H04M 1/24; H04M 3/22
[52] U.S. Cl. ................................. 379/27; 379/2; 379/9; 379/15; 379/16; 379/17; 379/22; 379/29
[58] Field of Search ............. 379/1, 2, 8, 9, 15, 379/16, 17, 18, 22, 24, 27, 29

[56] References Cited

U.S. PATENT DOCUMENTS

| | | | |
|---|---|---|---|
| 2,649,513 | 8/1953 | Luhn | 200/11 |
| 2,896,033 | 7/1959 | Hartz | 200/11 |
| 2,971,066 | 2/1961 | Tabet | 200/11 |
| 3,030,848 | 4/1962 | Wick | 84/445 |
| 3,119,905 | 1/1964 | Nicolaus | 200/11 |
| 3,284,572 | 11/1966 | Hesselgren | 179/5 |
| 3,531,603 | 9/1970 | Ashman | 200/11 |
| 3,808,381 | 4/1974 | Jacobs | 379/16 |
| 4,105,875 | 8/1978 | Schneider | 379/15 |
| 4,212,000 | 7/1980 | Yamada | 340/347 P |
| 4,390,757 | 6/1983 | Wiessner | 200/11 G |
| 4,520,234 | 5/1985 | Fields et al. | 179/2 A |
| 4,833,708 | 5/1989 | Goodrich | 379/327 |
| 4,991,196 | 2/1991 | Krebs | 379/29 |
| 5,054,050 | 10/1991 | Burk | 379/27 |
| 5,187,732 | 2/1993 | Suzuki | 379/15 |
| 5,222,119 | 6/1993 | Asano | 379/29 |

Primary Examiner—Stephen Chin
Assistant Examiner—Vijay Shankar
Attorney, Agent, or Firm—William E. Hein

[57] ABSTRACT

A remotely controlled telephone system terminal box provides non-blocking connectivity between any selected unassigned pair of a plurality X of distribution pairs of lines and any selected plurality Y of drop pairs of lines and employs a plurality X of multiple-position rotary stepper switch blocks each driven by a stepper motor, the stepper switch blocks being selectively actuated by commands from a remotely located central office controller. A continuity test circuit within each of the terminal boxes is responsive to commands from the central office controller for verifying that electrical contact is made between an associated one of the plurality X of distribution pairs of lines and a selected one of the plurality Y of drop pairs of lines. A control pair contention circuit within each of the terminal boxes allows a plurality of the terminal boxes forming a distribution network to be controlled by a single control pair of lines coupling all of the terminal boxes to the central office controller. Each control pair contention circuit is responsive to energization of the single control pair of lines for causing a selected one of the plurality of terminal boxes of the distribution network to become active and for causing the other terminal boxes of the distribution network to become inactive.

6 Claims, 13 Drawing Sheets

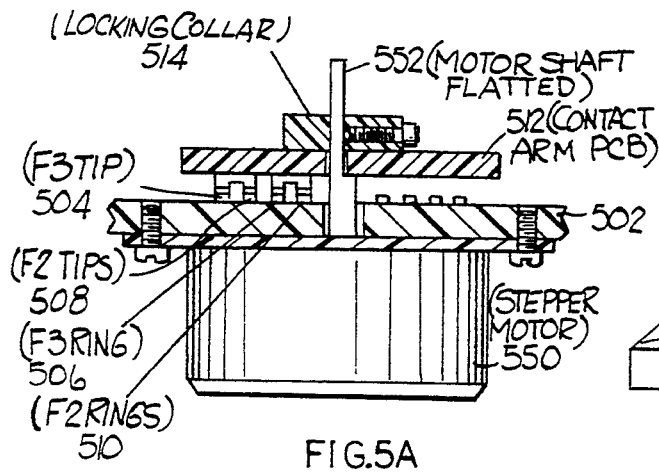
FIG.5A
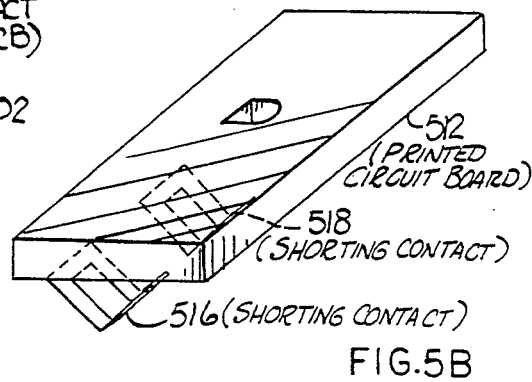
FIG.5B
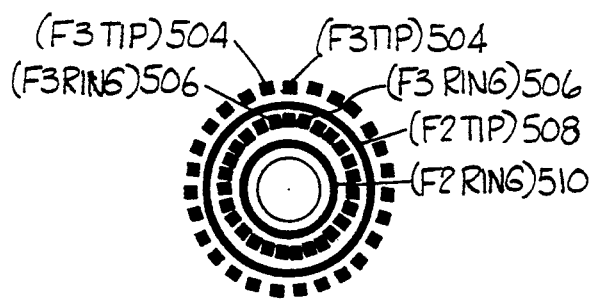
FIG.5C
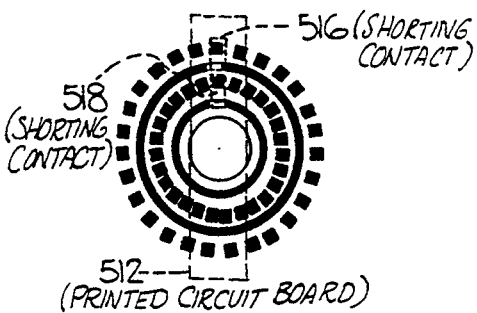
FIG.5D
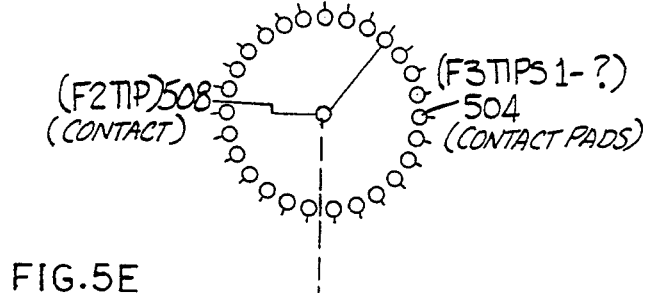
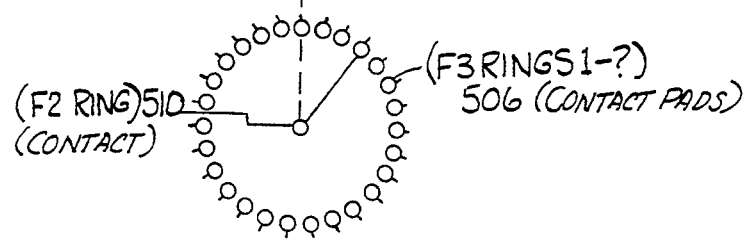
FIG.5E

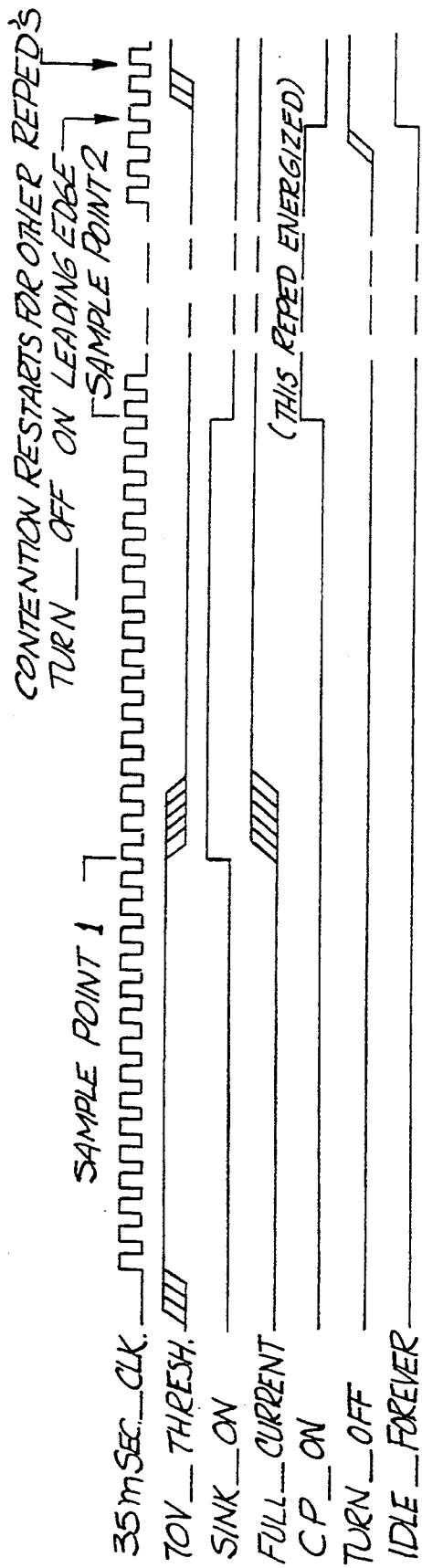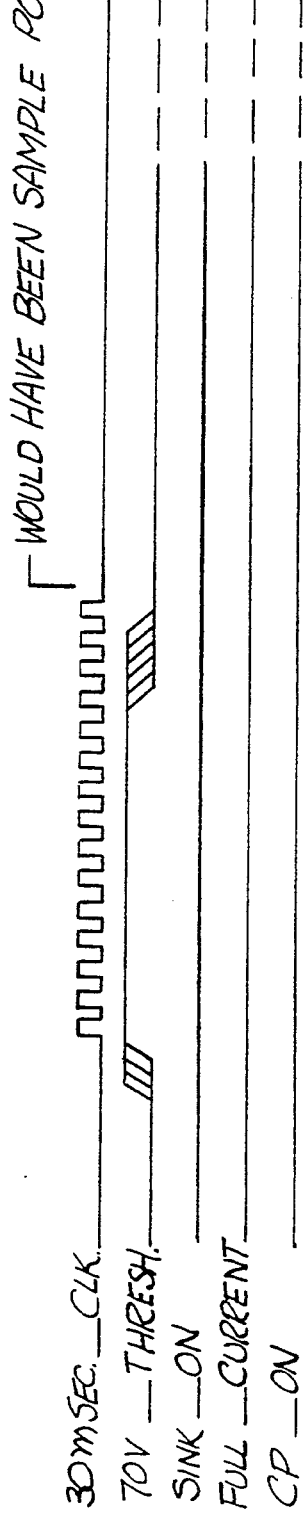
FIG. 8A — WINNING CONTENDER
Contention Resolved At Sample Point #1
FIG. 8B — LOSING CONTENDER
Contention Resolved At Sample Point #1

LOSING CONTENDER #1
CONTENTION RESOLVED AT SAMPLE POINT #2

LOSING CONTENDER #2
CONTENTION RESOLVED AT SAMPLE POINT #2

REMOTELY CONTROLLED MULTIPLE PAIR TELEPHONE PEDESTAL/BUILDING TERMINAL

BACKGROUND AND SUMMARY OF THE INVENTION

This invention relates generally to remotely controlled, automated telephone system terminal boxes, such as pedestals, aerial terminals, and building terminals, typically used by telephone utilities to facilitate interconnection of telephone cable pairs. More particularly, the present invention relates to electronically controlled, remotely actuated switching of a non-blocking network for use by telephone companies in lieu of prior art manual pedestals, aerial terminals or building terminals.

Pedestals, aerial terminals, and building terminals are used extensively in the telephone outside plant industry to distribute service to telephone subscribers. A pedestal, aerial terminal or building terminal is generally used as the cross-connect point between a multi-pair (typically 25 pairs) telephone cable and the individual pairs of wires that lead directly to a telephone subscriber's location, such as a residence or small business. The pairs of wires in the multi-pair cable are referred to as distribution or F2 pairs or lines, whereas the individual pairs are referred to as drop or F3 pairs or lines. In a traditional aerial terminal, for example, the multi-pair cable is strung between telephone poles in an alley or along a road. Multiple aerial terminals are typically spaced along the cable route such that the drop pairs to a telephone subscriber's location do not have to travel far before reaching the nearest terminal. Inside the terminal, cross-connect points are provided that allow the drop pairs to be attached to many, or all, of the pairs in the multi-pair cable. In the interest of most efficiently using a given number of distribution pairs, the same distribution pairs are available for cross-connecting at several terminals along a route. This example is equally valid for locations utilizing building terminals, in which case the drop pairs are within a building, such as an apartment complex, and pedestals, in which case the distribution and drop pairs are buried, such as in a utility trench behind a residential subdivision.

Traditionally, pedestals, aerial terminals, and building terminals have been manually wired. Thus, when a cross-connect needs to be changed, a service person must be dispatched to the terminal location to move or add the particular cross-connect. This approach has generally been acceptable in the past, but as subscriber demand for more second line services has increased, so has the need for automation in this portion of the telephone network. An automated terminal must include a non-blocking network to ensure full utilization of the small number of distribution pairs that are typically available.

In the past, non-blocking networks have been generally uneconomical. Known electronically operated cross connect systems, such as that described in U.S. Pat. No. 4,833,708 to Goodrich, were limited in their ability to switch input/output telephone lines. The switching matrix of these prior art cross connect systems did not allow full use of the input lines because as the system became loaded, some of the input lines were blocked by the accessible input pairs already assigned to other output pairs.

It is therefore a principal object of the present invention to provide a remotely controlled multiple pair pedestal/building terminal (REPED) in which a multiple-position rotary switch is driven by a stepper motor and electronically controlled by a common feeder pair.

It is a further object of the present invention to provide a remotely controlled multiple pair pedestal/building terminal that incorporates a feeder pair contention circuit for permitting a single feeder pair carrying both power and control signals from the central office to electronically control a multiplicity of remote pedestals/building terminals.

It is a further object of the present invention to provide a remotely controlled multiple pair pedestal/building terminal that incorporates a continuity test circuit for facilitating 100% testing of connections between input and output telephone lines, the continuity test circuit being designed such that even while a continuity test is being performed on an active line, the user is unaffected and will not notice the test being performed.

These and other incidental objects are accomplished in accordance with the illustrated preferred embodiment of the present invention by combining a plurality of stepper switch blocks, each of which includes a high resolution stepper motor, a switch arm assembly, and a multiplicity of contact pads arranged in two concentric circles on a printed circuit board. The high resolution stepper motor is employed to position the switch arm assembly on contact pads representing a desired output telephone pair. The number of steps executed by the stepper motor is determined by a software algorithm based on the size of the system. A large output complement, for example, requires more switch contact pads on the printed circuit board and fewer steps between contact pad positions. A stepper switch block may be replicated to construct a square or rectangular matrix of input and output telephone pairs. The number of switch contact pads determines the size of the remotely controlled multiple pair pedestal/building terminal system being constructed. In the case of a square switching matrix, the number of contact pads on each stepper switch block is equal to the number of switching blocks in the system. Rectangular switching matrices may be built with an unequal number of pads and switching blocks. The switch arm assembly or rotor of each stepper switch block is connected to an input distribution telephone pair.

Two additional stepper switch blocks and their associated driver circuits comprise the continuity test circuit that is employed to accomplish continuity testing. The continuity test circuit reduces the reliability required of each stepper switch block, since feedback is available to make minor adjustments to the number of steps executed by the stepper motor. In this way the switch arm assembly or rotor may be positioned at the center of each of the switch contact pads on the printed circuit board.

BRIEF DESCRIPTION OF THE DRAWINGS

FIGS. 5A–E are illustrations of a representative one of the stepper switch blocks employed in each of the REPEDs of FIGS. 1–4.

FIGS. 8A–B are timing diagrams of signals associated with the feeder pair contention circuit of FIGS. 7A–D, illustrating the way in which contention between the REPEDs of FIG. 1 is resolved at a first sample point in time.

DETAILED DESCRIPTION OF THE PREFERRED EMBODIMENT

Figure 1:
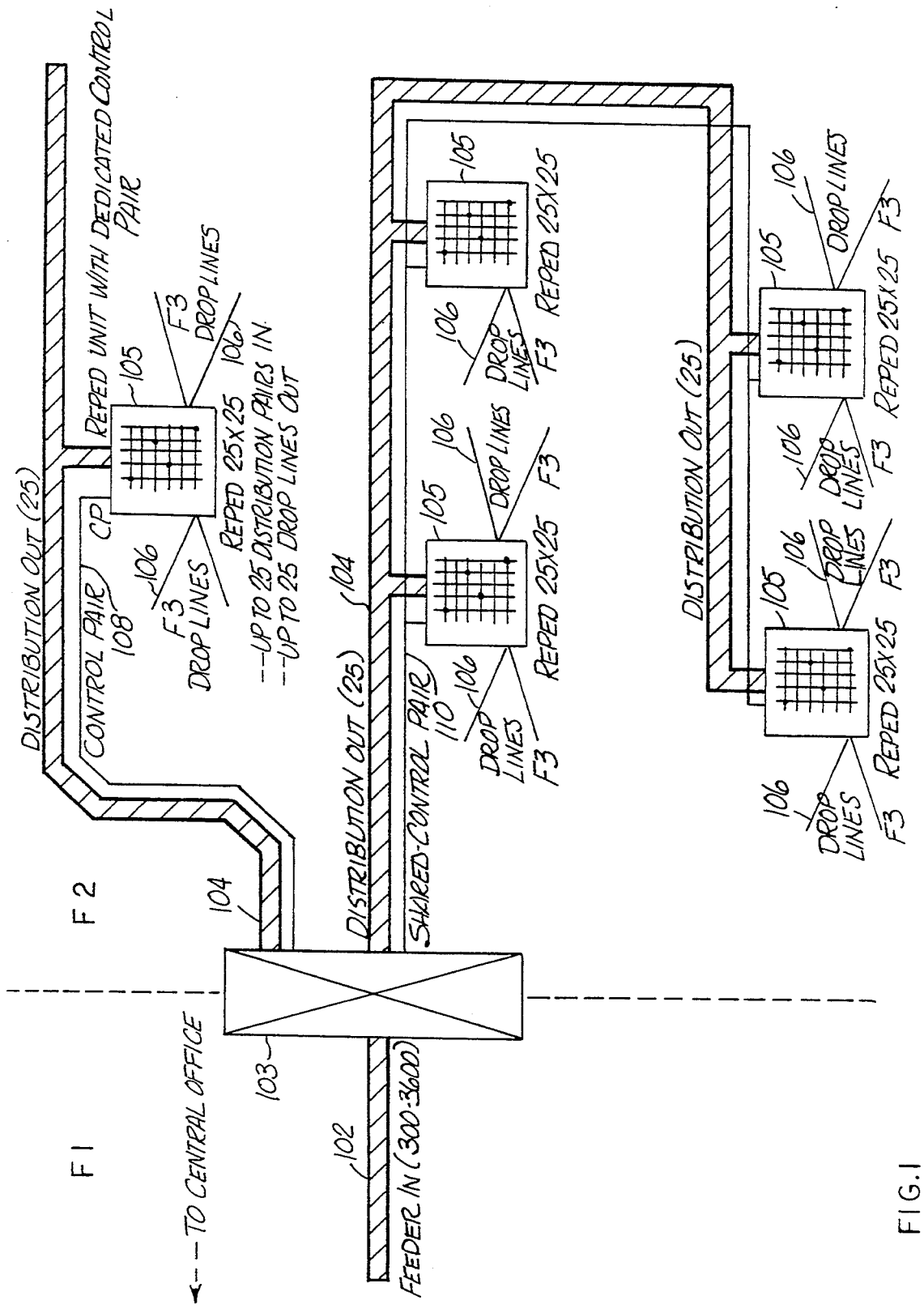
FIG. 1 is an overall block diagram of a telephone distribution system illustrating the way in which a plurality of remotely controlled multiple pair pedestals/building terminals (REPEDs) constructed in accordance with the present invention may be interconnected, each of the REPEDs providing non-blocking switched connectivity betwen 25 distribution input pairs of lines and 25 drop pairs of lines.

Referring now to the overall block diagram of FIG. 1, there is shown a telephone distribution system in which a multiplicity of F1 feeder pairs of lines 102 extending from a remotely located central office are distributed by means of a conventional cross-connect cabinet 103 as groups of twenty-five F2 distribution pairs of lines 104. Cross-connect cabinet 103 may comprise, for example, the remote cable pair cross-connect system described in U.S. Pat. No. 4,833,708 to Goodrich. A plurality of remotely controlled multiple pair pedestals/building terminals (REPEDs) 105, constructed in accordance with the present invention, provide non-blocking switched connectivity between each group of twenty-five F2 distribution pairs 104 and twenty-five F3 drop pairs 106. The REPEDs 105 may be controlled by a dedicated control pair 108 or by a shared control pair 110. Though 25 pairs of lines i s a standard size, the same concept holds for other pair sizes as well.

Figure 2:
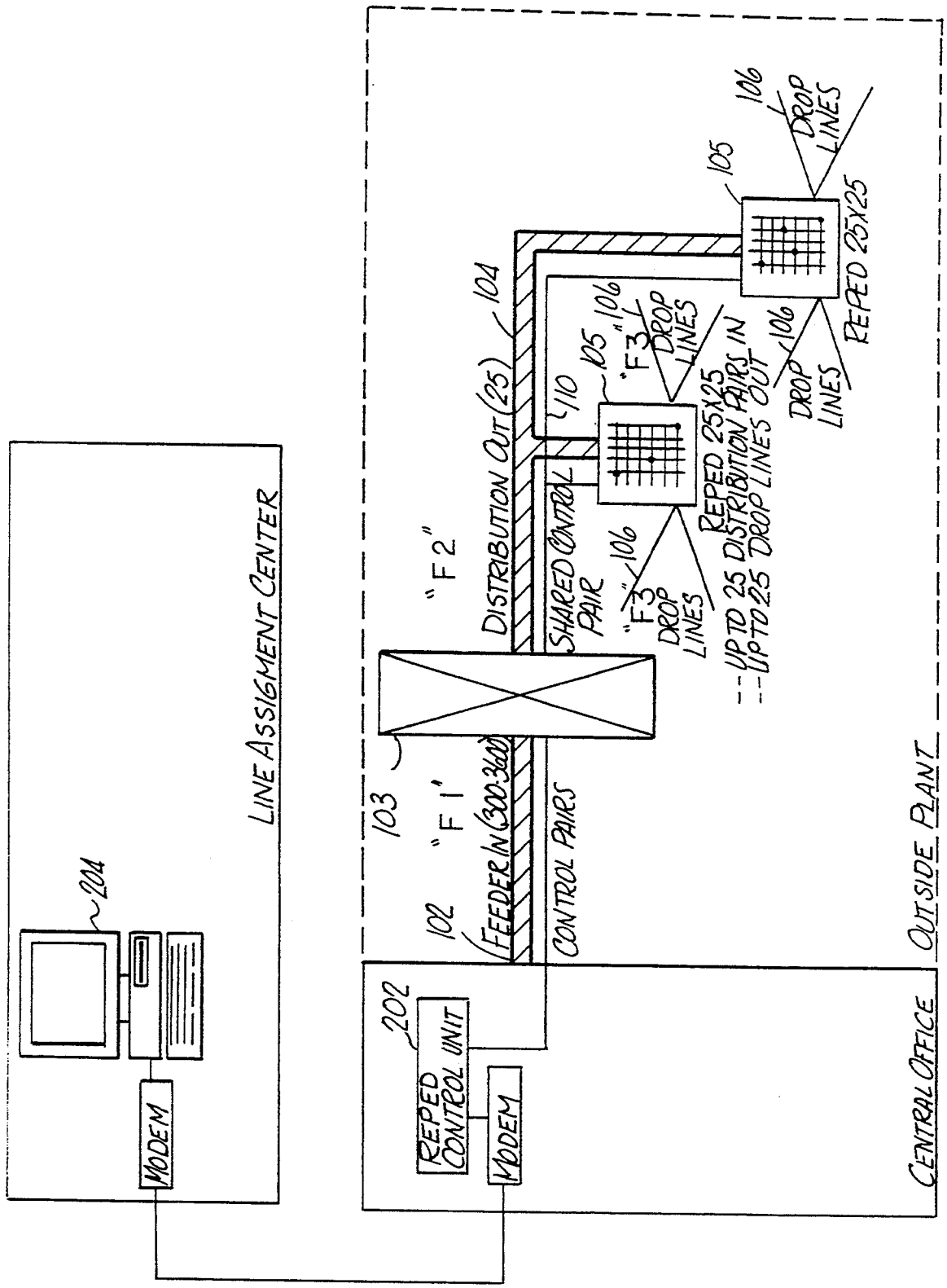
FIG. 2 is an overall block diagram illustrating how the REPEDs employed in the telephone distribution system of FIG. 1 are controlled by means of a central office control unit and a line assignment center computer.

Referring now to the overall block diagram of FIG. 2, it may be understood how the telephone distribution system of FIG. 1 is interfaced to one or more conventional central office REPED control units 202, as well as to a conventional line assignment center computer 204. The REPED control unit 202 is similar to conventional controllers such as that also described in U.S. Pat. No. 4,833,708 to Goodrich.

Figure 3:
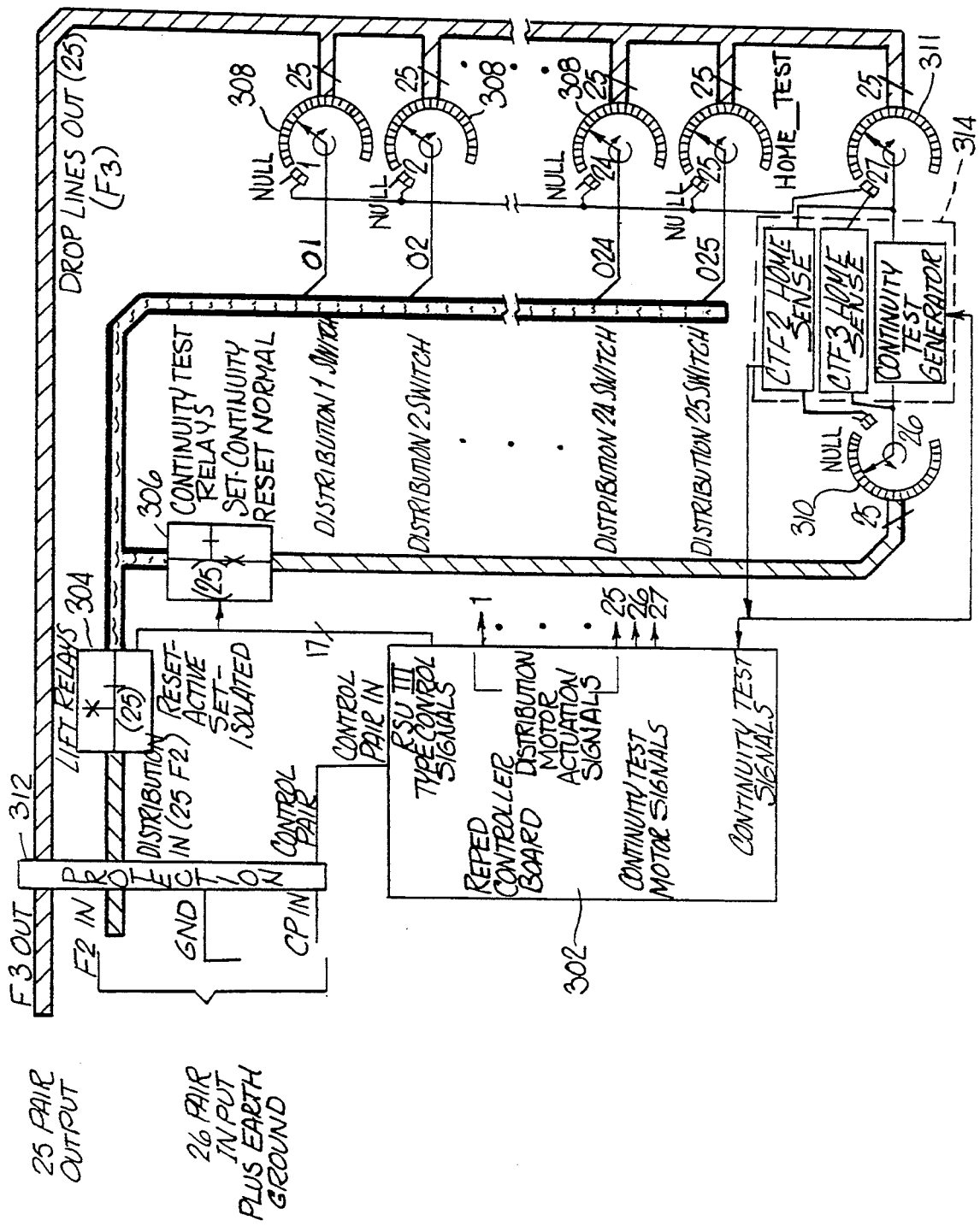
FIG. 3 is an overall block diagram of a representative one of the REPEDs employed in the telephone distribution system of FIGS. 1 and 2.

Referring now to FIG. 3, there is shown a block diagram of one of the REPEDs 105 employed in the telephone distribution system of FIGS. 1 and 2. As stated above, each of the REPEDs 105 generally functions as a non-blocking switch matrix to connect any of twenty-five input pairs of lines to any of twenty-five output pairs of lines. Each of the REPEDs 105 includes a REPED controller board 302 containing circuitry for controlling REPED operation, a relay board containing protection devices for each line 312, two groups of twenty-five DPDT relays 304, 306 that enable continuity testing and isolation during execution of switching commands, a non-blocking 25×25 pair switching matrix implemented as twenty-five stepper switch blocks 308, and a continuity test circuit comprising a pair of stepper switch blocks 310, 311 and associated circuitry 314.

Protection circuitry 312 employs sidactor protectors on each line entering or exiting one of REPEDs 105, whether it is a distribution pair, a drop pair or a control pair. These devices protect against over-voltage conditions on a pair by pair basis. Should an over-voltage condition occur (i.e. a voltage with an absolute value greater than approximately 270 volts with respect to earth ground) the protector will fire, effectively shorting the impacted lead to ground.

The group of relays 304 serve as lift relays to isolate the distribution pairs from each of the stepper switch blocks 308. Since the rotors of the stepper switch blocks 308 are attached to the input distribution pairs, it is important to isolate each of the stepper switch blocks 308 from its associated distribution pair while the stepper switch 308 is stepping. Otherwise, the distribution line will be momentarily cross-connected to each of the drop pairs until the stepper switch 308 has stepped to the desired drop pair.

The group of relays 306 serve as continuity test relays to attach the distribution pairs to the respective contacts of the distribution continuity test stepper switch block 310 on a pair by pair basis. In normal operation, these relay contacts are open. When it is desired to test the continuity of a connection through one of the REPEDs 105, one of the continuity test relays 306 is actuated to connect the distribution pair of the connection to be tested to the associated contacts of the continuity test stepper switch block 310.

The actual cross-connecting function of each of the REPEDs 105 is performed by the associated one of the stepper switch blocks 308. Each of the stepper switch blocks 308 includes a stepper motor, a rotor arm connected to a distribution pair, and multiple contact pads connected respectively to each of the drop pairs in the telephone system. Two extra contact positions are included on each of the stepper switch blocks 308. The first of these two extra contact positions is the home-test position, which is used in conjunction with one of the continuity test relays 306 and the continuity test stepper switch blocks 310, 311 to establish the position of the distribution motor before a cross-connect is made. For example, with the drop continuity test stepper switch block 311 set to the home-test position, the distribution continuity test stepper switch block 310 set to the distribution number of the one of stepper switch blocks 308 to be tested, and the respective continuity test relay 306 in the continuity test position, continuity will be indicated when the respective one of the stepper switch blocks 308 is in the home-test position. The second of the two extra contact positions included on each of the stepper switch blocks 308 is the null position. Each of the stepper switch blocks 308 is positioned in this null position when it is not in use (i.e. no cross-connect exists for this distribution pair).

The REPED controller board 302 serves to control the operations of the REPED switching and test circuitry under the command of a REPED control unit 202 located at the telephone company central office. The REPED controller board 302 accepts and performs the following commands from the REPED control unit 202: 1) Set/Reset a continuity relay 306; 2) Set/Reset a lift relay 304; 3) Step a stepper switch block 308 a desired number of steps; 4) Step the distribution continuity test stepper switch 310 or the drop continuity test stepper switch 311 to its home position; 5) Step a distribution stepper switch block 308 until continuity is detected (this command may be used to set a distribution stepper switch block 308 to the home position or to a particular drop pair depending on the position of the drop continuity test switch 311); 6) Perform a continuity test to verify a cross-connect; 7) Get the serial number of a particular one of REPEDs 105; and 8) Power off this particular one of REPEDs 105 to allow another one of the REPEDs 105 to seize the shared control pair 110.

Figure 4:
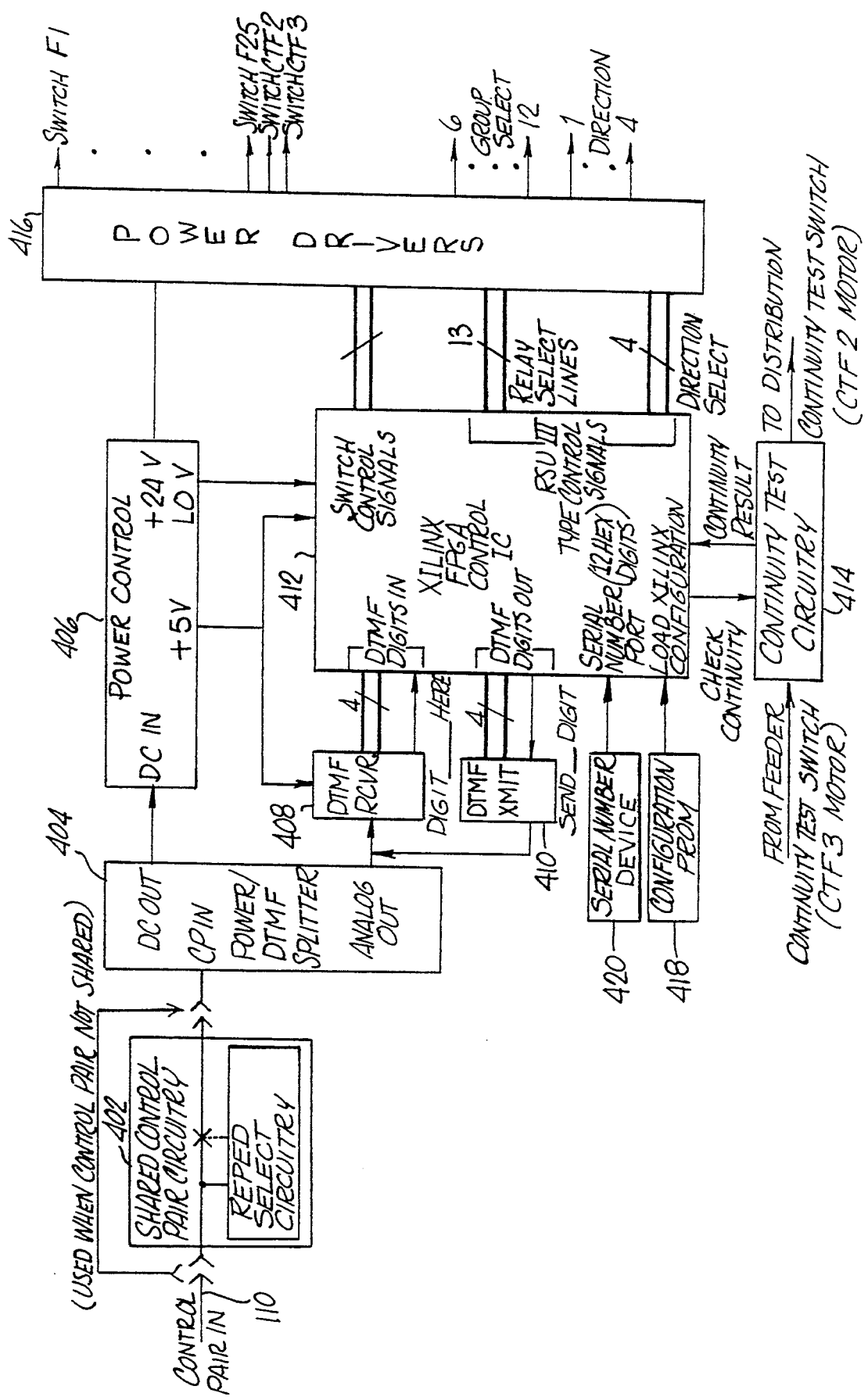
FIG. 4 is a detailed block diagram of circuitry contained on the REPED controller board of FIG. 3.

Referring now to FIGS. 3 and 4, the REPED controller board 302 controls the operation of the associated one of REPEDs 105 at the command of the REPED control unit 202. When multiple ones of REPEDs 105 are controlled by the same control pair 110, the shared control pair circuitry 402 is utilized to perform contention resolution such that only one of the REPEDs 105 is active on the control pair 110 at any given time. Only one of the REPEDs 105 can be active on the loop because the available current on shared control pair 110 is limited to 40 mA, enough to drive only one of the REPEDs 105. Once the shared control pair circuitry 402 has successfully prevailed in contention for the control pair 110, power is applied to the Power/Dual Tone Multi-Frequency (DTMF) splitter 404 on REPED controller board 302. This circuit separates the power signal from the tone signals and routes the tone signals to their respective destinations. The power signal is converted from a 40 mA current signal into a 30 V unregulated voltage signal that serves as the input to the power control block 406. The tone signaling path, via analog out, is a low AC impedance path for tone signals both to and from the REPED control unit 202 and the DTMF receiver and transmitter 408 and 410, respectively.

The power control circuitry 406 develops the regulated voltages required of the other circuitry on the REPED controller board 302 and provides supervision of those voltages, with outputs including the power up reset signal, and indications of low or lost voltages (LOV signals) to the Xilinx field programmable gate array (FPGA) 412. As stated above, the input to the power control circuit 406 is an unregulated 30 V signal. The power outputs of this circuit are +5 V to drive the logic circuits and +24 V to supply the power drivers 416.

The DTMF transmitter and receiver 410 and 408, respectively, are used to communicate with the REPED control unit 202. DTMF communications is half duplex over the shared control pair 110. This communications format is well understood to those persons having ordinary skill in the art of telephone communications.

The Xilinx FPGA 412 functions as the brain of each of the REPEDs 105, acting under the control of the REPED control unit 202 with which it communicates using DTMF signaling. This device is programmed when power is applied from the power control circuit 406 by the configuration PROM 418 as described in the commonly available data sheets for FPGA 412. Once configured, FPGA 412 accepts commands from the REPED control unit 202 in the form of strings of DTMF digits. These digits are received by a DTMF receive state machine which checks each command for proper reception. Once a command has been properly received, the command is performed by converting the it into a sequence of timed steps under state machine control. The list of commands that can be performed is set forth above.

A serial number device 420 can be accessed by FPGA 412 to deliver a unique serial number for each one of REPEDs 105 to the REPED control unit 202. The serial number is a 12 hex digit number ranging from 000000000000FFFFFFFFFFFF.

FPGA 412 controls the continuity test circuitry 414 and the power drivers 416. Power drivers 416 are connected to the coil s of stepper motors in each of the steppers switch blocks 308 and to the coils of the lift relays 304 and continuity test relays 306. FPGA 412 controls the timing of the pulses applied to the power drivers 416 and hence, to the various stepper motor coils.

Referring now to FIGS. 5A–E, each of the twenty-five stepper switch blocks 308, as well as the continuity test stepper switch blocks 310, 311, of FIG. 3 is constructed in accordance with the detailed illustrations of these figures. A stationary printed circuit board 502 contains an outer circular arrangement of twenty-five F3 tip contact pads 504, an inner circular arrangement of twenty-five F3 ring contact pads 506, an outer solid circular F2 tip contact 508, and an inner solid circular F2 ring contact 510. The two circular arrangements of contact pads 504, 506 and the two solid circular contacts 508, 510 are concentric about a central opening in printed circuit board 502. A stepper motor 550 is fixedly mounted to the underside of stationary printed circuit board 502. Stepper motor 550 includes a shaft 552 that extends upward through the central opening in printed circuit board 502. A contact arm printed circuit board 512, secured by a locking collar 514, is mounted on the shaft 552 of stepper motor 550 above stationary printed circuit board 502 so as to move in concert with shaft 552. A pair of shorting contacts 516, 518 are positioned on the underside of contact arm printed circuit board 512. Shorting contact 516 serves to electrically connect the outer circular F2 tip contact 508 to one of the twenty-five F3 tip contact pads 504 selected by the position to which contact arm printed circuit board 512 is rotated by stepper motor 550. Similarly, shorting contact 518 serves to electrically connect the inner circular F2 ring contact 510 to one of the twenty-five F3 ring contact pads 506 selected by the position to which contact arm printed circuit board 512 is rotated by stepper motor 550.

Since there is no positive indication that a stepper motor 550 actually turned its contact arm printed circuit board 512 in response to a signal from REPED controller board 302, it is necessary to provide a continuity test circuit to produce a positive indication that a particular one of the stepper switch blocks 308 is in its intended cross-connect position. In addition, this continuity test circuitry can be used to verify at a later date and time that a particular one of the stepper switch blocks 308 is properly cross-connected. This verification is accomplished by the continuity test circuit without affecting normal telephone subscriber service on the line.

Figure 6A:
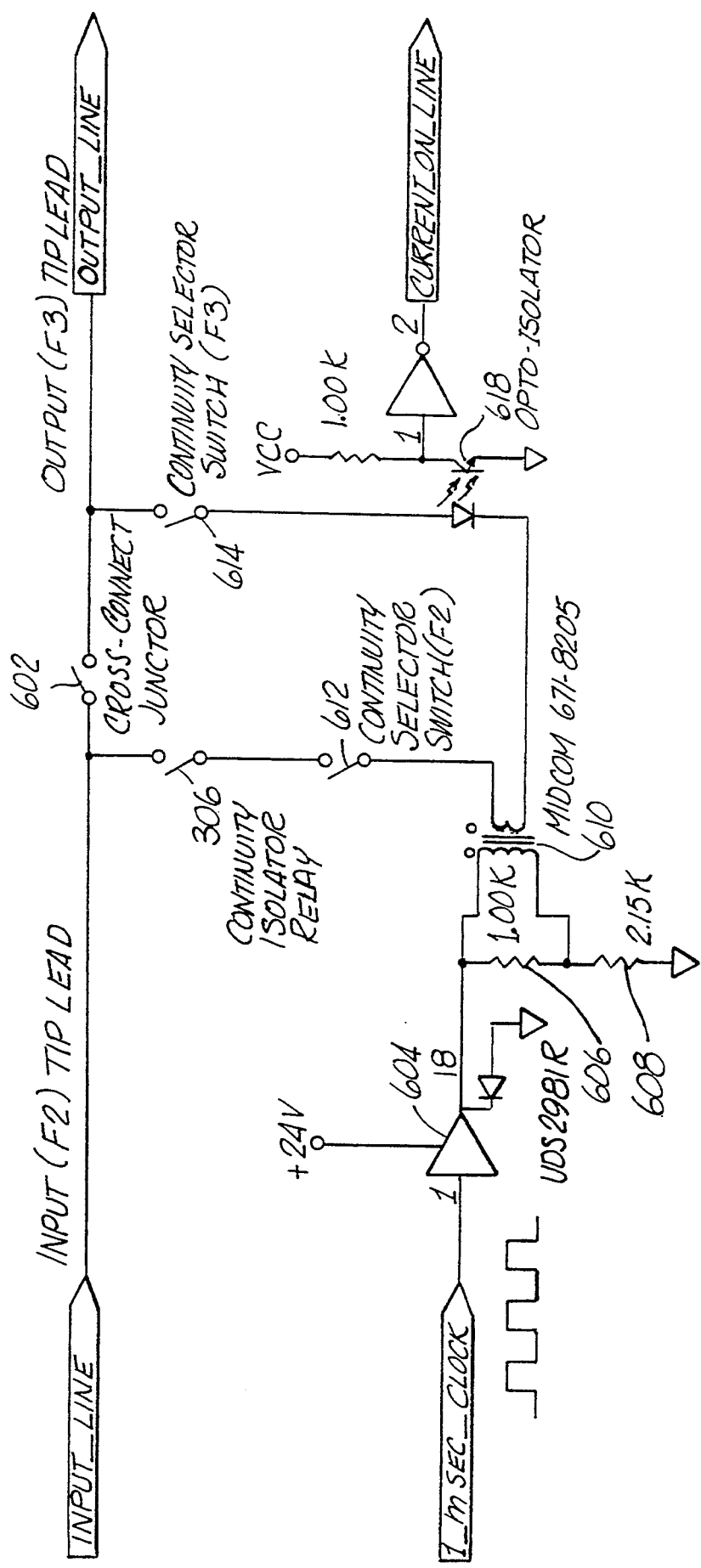
FIGS. 6A–B are a detailed schematic diagram of a continuity test circuit employed in each of the REPEDs of FIGS. 1–4.
Figure 6B:
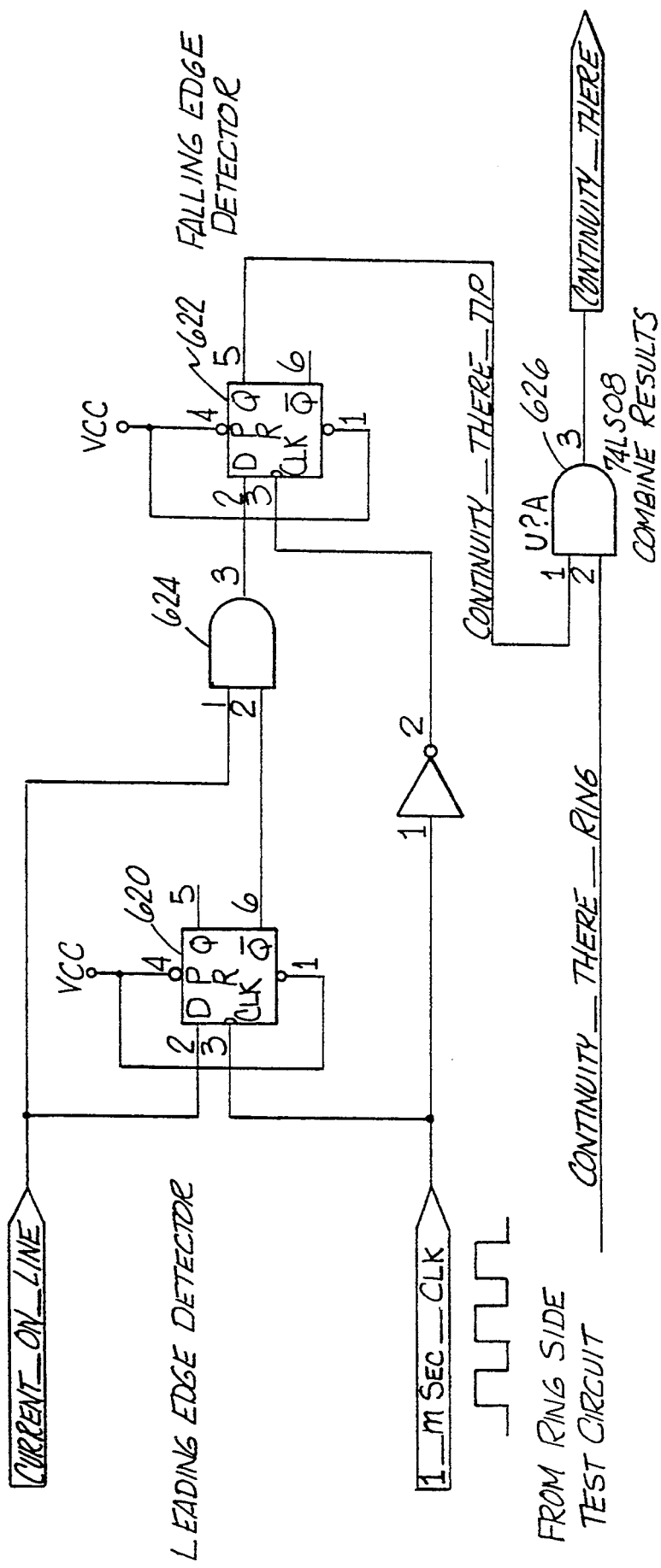
Figure 7A:
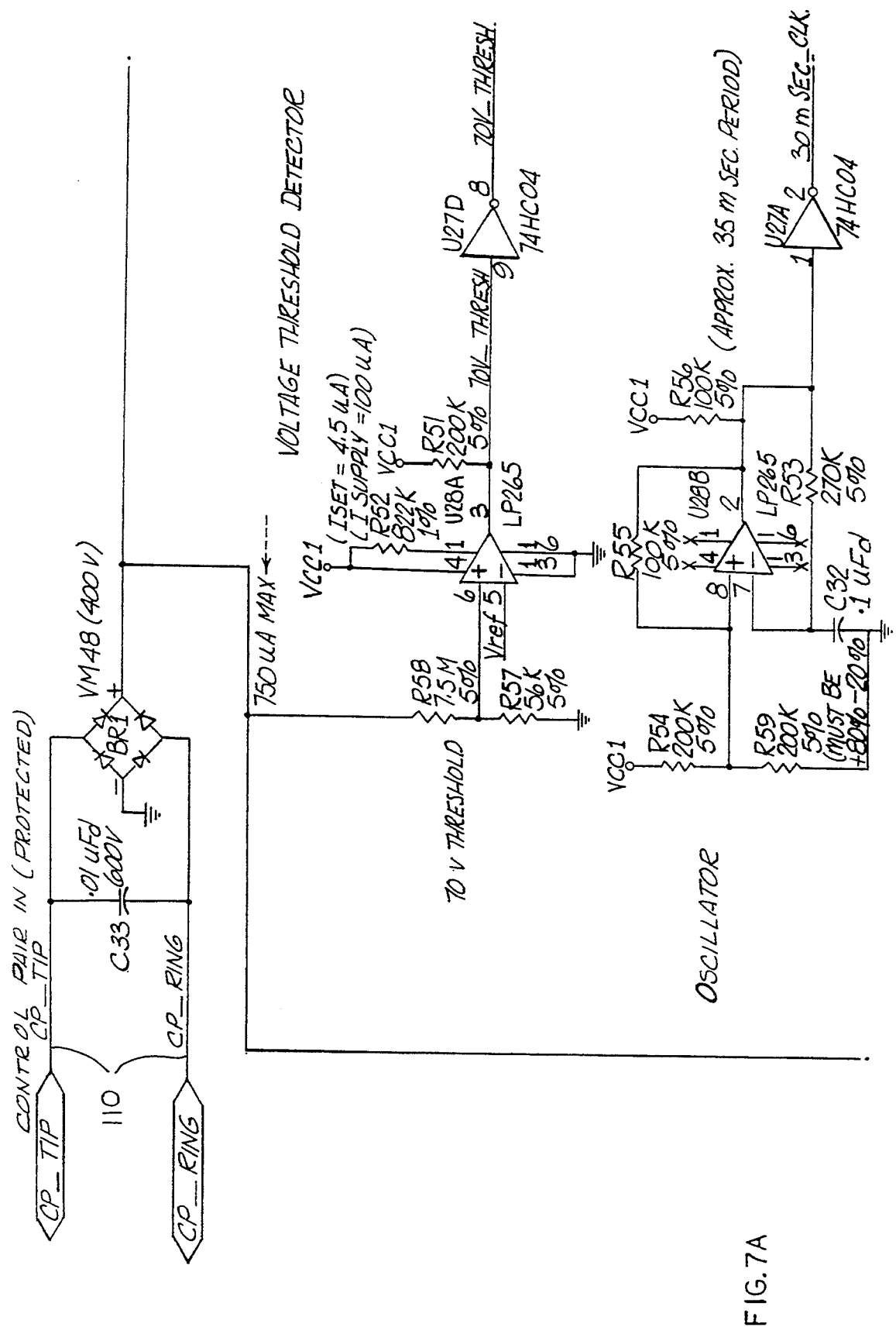
FIGS. 7A–D are a detailed schematic diagram of a feeder pair or control pair contention circuit employed in each of the REPEDs of FIGS. 1–4.
Figure 7B:
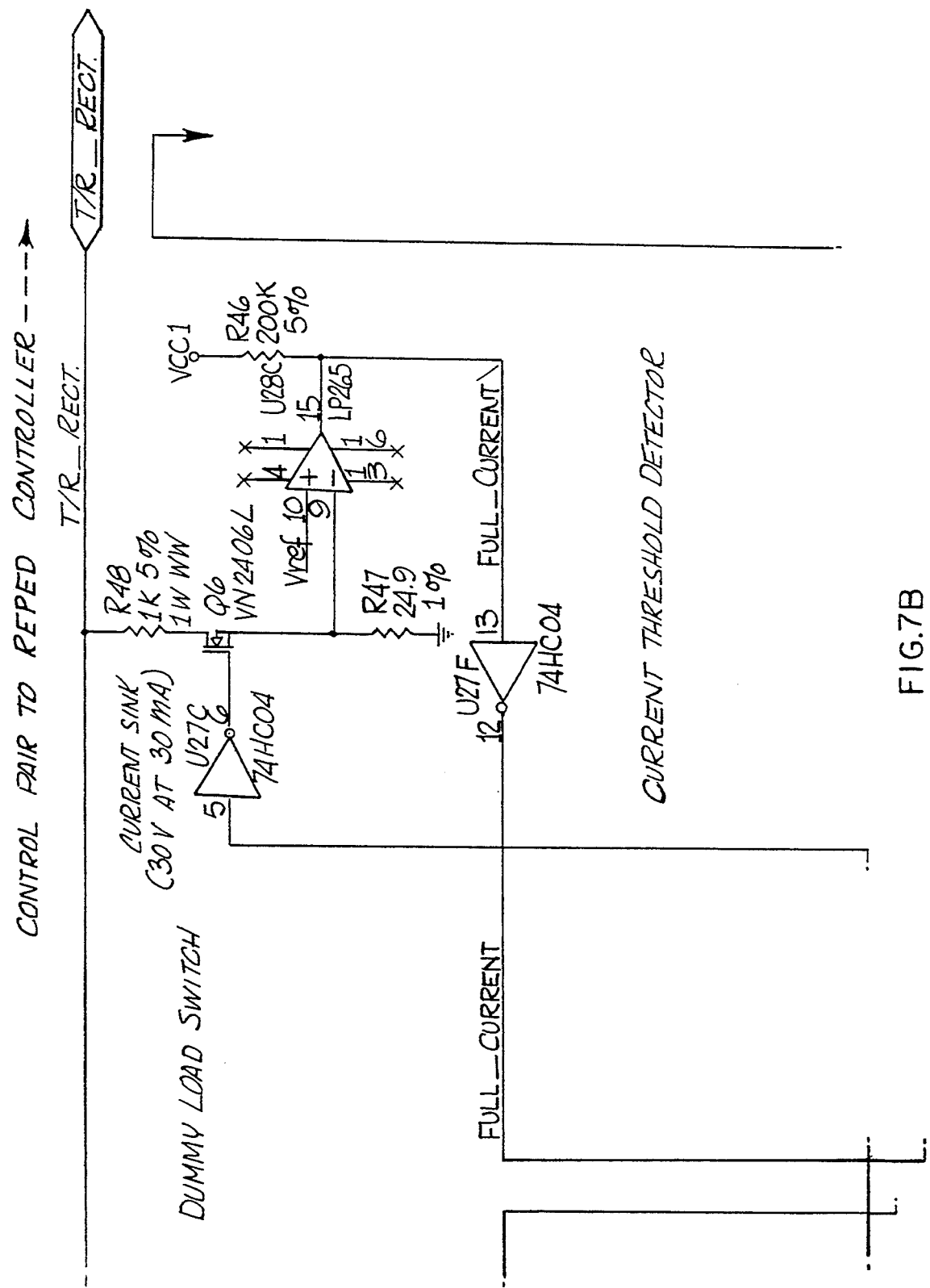
Figure 7C:
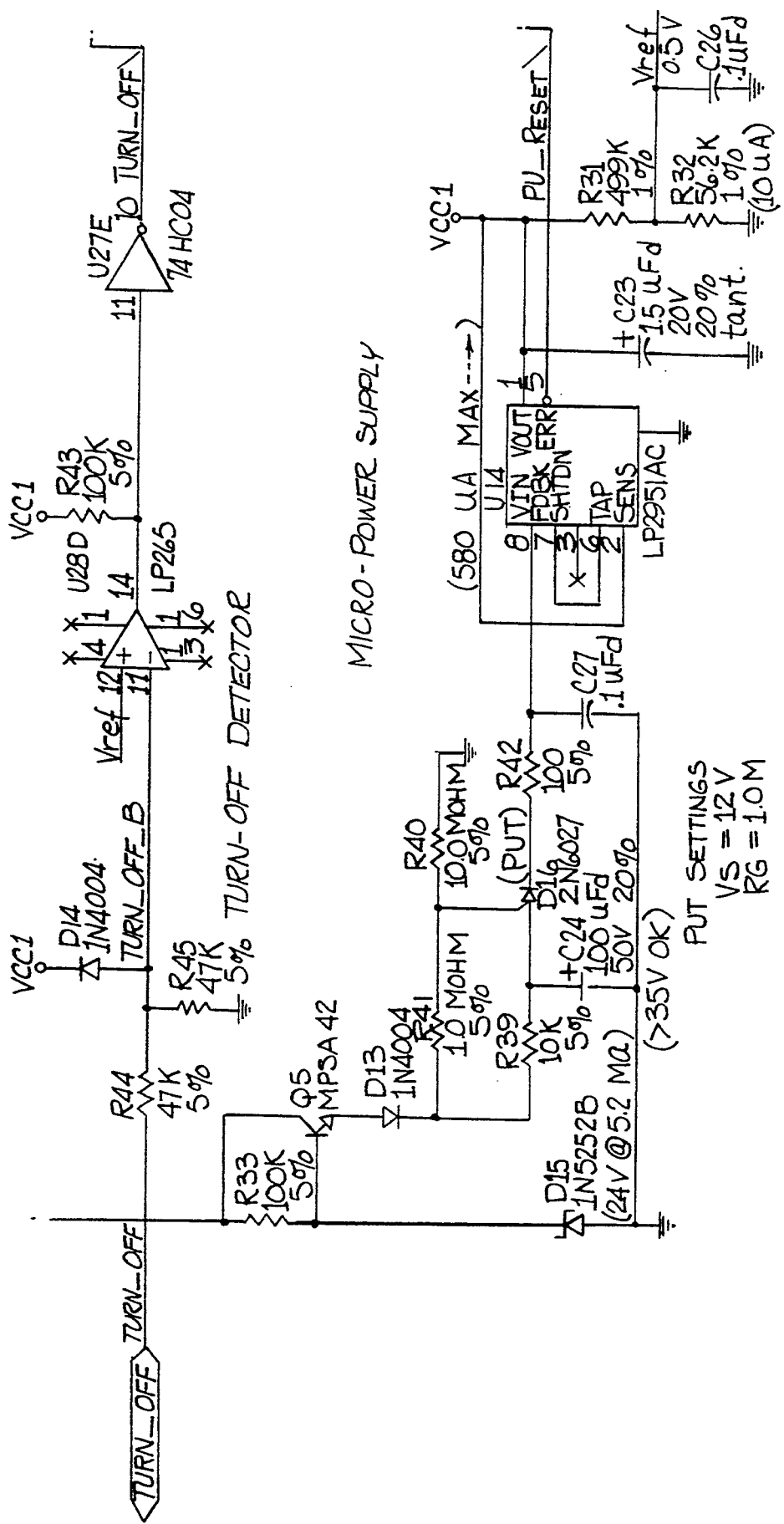
Figure 7D:
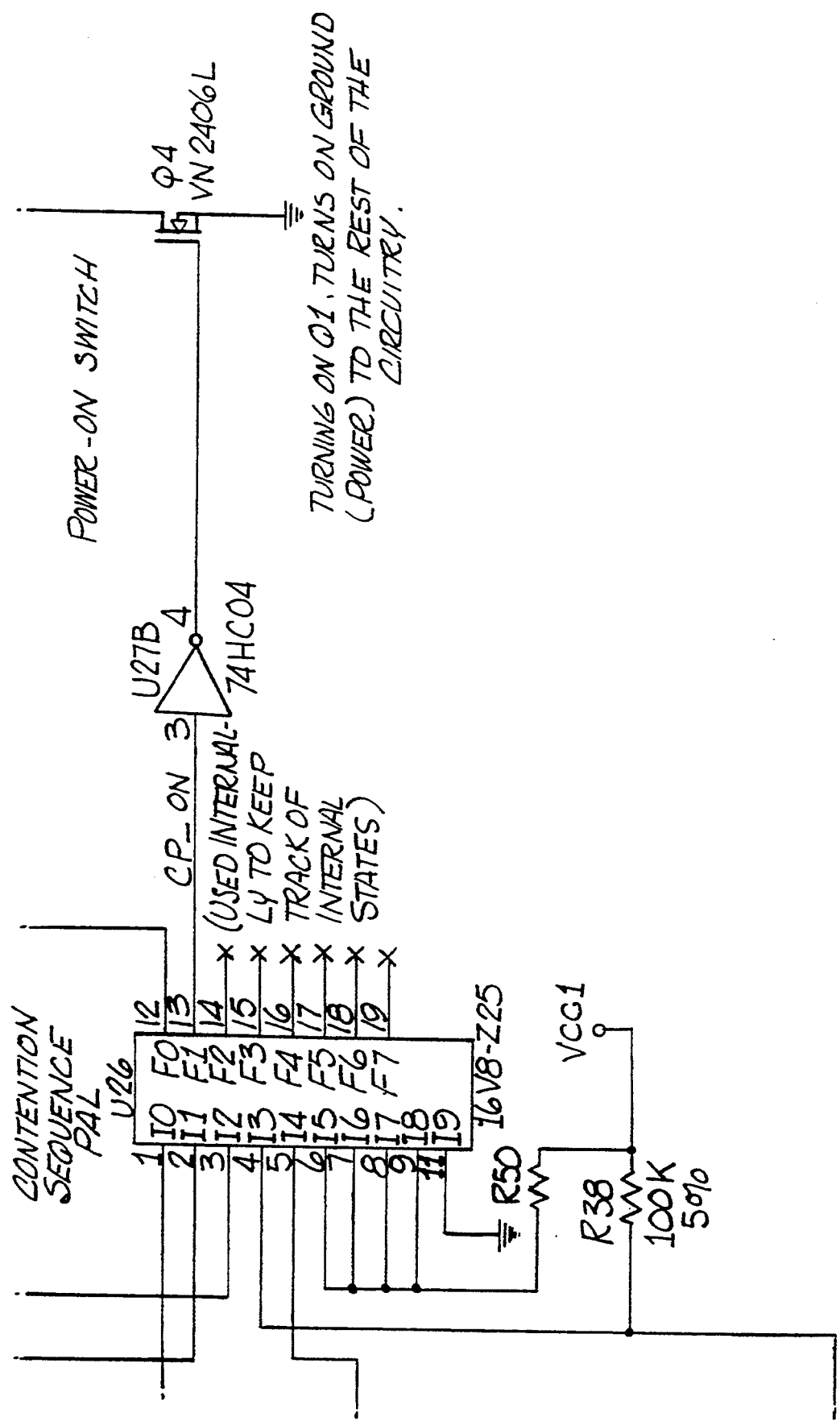

Referring now to FIGS. 6A–B, there is shown a detailed schematic diagram of the continuity test circuit employed in each of the REPEDs 105 of FIGS. 1 and 2. The continuity test circuit is capable of determining the continuity of a connection through any one of the REPEDs 105 without affecting service on the line on which continuity is being tested. The continuity test circuit of the present invention generally employs transformers to couple current pulses through the cross-connection under test and opto-isolators to detect the current pulses and relay their presence to the continuity test logic. Since each connection involves a pair of signal lines, the continuity test circuit tests the continuity of both signal lines simultaneously.

The continuity test logic employed in the continuity test circuit of the present invention ensures that when an opto-isolator detects current, it is indeed the result of a generated current pulse flowing through a made cross-connect, and not the result of a DC voltage imbalance between two unconnected lines. While FIGS. 6A–B illustrate circuitry for a single continuity test circuit, continuity is actually checked on a pair of circuits at the same time. In a final logic step, the results of the continuity test on both lines of a pair are merged to create a single continuity_there signal.

The continuity test circuit of the present invention does not result in any degradation whatsoever in the service signals normally present on a pair of lines. This is because the continuity test pulse current flows only in the loop comprising a transformer, three switches, an opto-isolator, and the cross-connect connection itself. The continuity test pulse current does not flow in the F2 distribution input lines or the F3 drop output lines. The only measurable impact on these lines is due to any resistance in a cross-connect junctor, which is on the order of fifty milli-ohms. Nominally, a 0.5 milli-volt pulse is injected onto each line. In addition, since the continuity test is applied to both the tip and ring lines simultaneously, any voltage developed due to the continuity test pulses appears common mode, or longitudinally, in telephone parlance. Most telephone circuits are designed to reject longitudinal signals at least 40 dB, and usually 60 dB. This reduces the impact of the 0.5 milli-volt signal to an effective differential level at or below five micro-volts, a completely inconsequential level for any signal being sent down a telephone line.

As illustrated in FIGS. 6A–B, a cross-connect junctor or connection 602 is the actual connection mechanism under test by the continuity test circuit of the present invention. Junctor 602 represents one contact of a distribution stepper switch block 308. Multiple ones of junctors 602 exist in each of the distribution stepper switch blocks 308, with multiple distribution stepper switch blocks 308 existing in each of the REPEDs 105, as described above. Each junctor 602 uniquely attaches an input line to an output line. The large number of junctors 602 necessitates performance of a continuity test. A pulse generator comprises a driver circuit 604 and two resistors 606, 608. The driver circuit 604 couples a current pulse into a transformer 610 with a peak current of approximately 10 mA. A pulse width of 1 milli-second couples well through transformer 610 that is designed for peak transmission at 1 KHz, such that the pulse is nearly square in shape, with minimal overshoot and droop. A switch 612 comprises a single contact of the distribution continuity test stepper switch block 310. Switch 614 comprises a single contact of the drop continuity test stepper switch block 311. Before a continuity test is performed, continuity test stepper switch blocks 310, 311 must be rotated into position to close contacts 612 and 614 for the respective input and output lines. The normally open continuity test relay 306 is kept open while the continuity test stepper switch blocks 310, 311 are rotated into position. Continuity test relay 306 is activated only during the short interval when the continuity test is being performed. When the continuity test is performed, if junctor 602 is closed, current flows in the test loop and is detected by opto-isolator 618.

Continuity test logic circuitry illustrated in FIG. 6B serves to detect a continuity pulse from opto-isolator 618. A pair of flip-flops 620, 622 comprise a leading edge detector and a falling edge detector, respectively, and are employed to sample and save detection information. The leading edge detector 620 is strobed at the beginning of a pulse, and it is expected that no current will be recognized by the opto-isolator 618. The transformer 610 and opto-isolator 618 are slow to respond with respect to the transition time of a CMOS flip-flop and therefore will not have responded to the pulse generator until well after the leading edge of the pulse. Detection of current by the leading edge detector 620 indicates that the two input and output lines under test are not connected, but that they have a DC voltage imbalance that is causing current to flow in the opto-isolator 618. If current is not detected by the leading edge detector 620, the not-Q output of leading edge detector 620 will go high, enabling the current_on_line signal via an AND gate 624 to the D input of the falling edge detector 622. When the falling edge of the 1 msec clock occurs 500 usec later, if current was detected by the leading edge detector 620, the output of the falling edge detector 622 will be forced low by AND gate 624 such that the continuity_there_tip signal will always be clocked false. If, however, the leading edge detector 620 did not detect current, and the connection is made, the output of the opto-isolator 618 will recognize the current pulse, the current_on_line signal will be high, and the Q output of the falling edge detector 622 will be high. In any case, after the falling edge of the i msec clock, which indicates the end of the continuity pulse, the falling edge detector 622 is strobed and the Q output of that device represents the continuity state of the connection under test. To complete the continuity test, exactly the same process has also occurred on the other line of the pair of lines on which continuity testing is taking place. A combine_results AND gate 626 merges the results of the two circuits under test and delivers the complete continuity_there signal. Verification that the input and output lines under test are indeed connected together is provided when this signal is high.

Referring now to FIGS. 7A–D, there is shown a detailed schematic diagram of a feeder pair contention circuit employed in each of the REPEDs 105 of FIGS. 1 and 2 to select one of the plurality of REPEDs 105 in response power being applied by the central office REPED control unit 202. The contention circuit of the present invention permits the single control pair 110 of FIGS. 1 and 2 to be shared by a multiplicity of REPEDs 105. Since the shared control pair 110 originates at a telephone central office typically located several miles away from the REPEDs 105, efficient use of an expensive underground telephone company resource is thereby realized.

The start up sequence of one of the REPEDs 105 begins when a control pair 110 originating at a particular one of the central office REPED control units 202 i s energized. Since multiple ones of REPEDs 105 are connected i n parallel on the same control pair, and only one of the REPEDs 105 can be active at a given point in time, contention is initiated for the shared control pair 110 upon energization. The result of contention is that the control pair 110 belongs to one and only one of the REPEDs 105. Following contention, the selected one of REPEDs 105 is powered up to enable it to receive REPED commands. Once a particular one of REPEDs 105 has been selected, it can be disabled by issuance of a power off command from the REPED control unit 202. Disabling one of REPEDs 105 results in its drawing less than 500 uA of current, allowing other ones of the REPEDs 105 to contend for the control pair 110, while preventing the disabled one of REPEDs 105 from contending for the control pair 110 as long as the control pair 110 remains energized.

Accessing an individual one of the REPEDs 105 is accomplished by way of the contention circuit within each one of the REPEDs 105 and involves the following sequence of steps:

1) When the shared control pair 110 is initially powered up, one of the REPEDs 105 will win control of the control pair 110 by being the quickest to respond.
2) Once a particular one of the REPEDs 105 has gained control of the control pair 110, the central office REPED control unit 202 will interrogate that REPED for its serial number. If the serial number received in response matches the serial number of the desired one of REPEDs 105, step number 4 below is performed; otherwise, step number 3 below is performed.
3) If the serial number received in response does not match the serial number of the desired one of REPEDs 105, the REPED control unit 202 issues a power down command to that REPED, turning it off for as long as control pair 110 remains energized. The contention circuitry in the remaining ones of REPEDs 105 now begins a new race to determine which one of those REPEDs will respond quickest so as to win control of the control pair 110. Processing now moves back to step number 2 above.
4) Once the REPED control unit 202 is connected to the one of REPEDs 105 having a serial number matching that of the desired one of REPEDs 105, the REPED control unit 202 begins issuing whatever commands are necessary to move the appropriate one of stepper switch blocks 308 within that now active one of REPEDs 105 to its assigned position. After these commands have been sent, the REPED control unit 202 has no further need to communicate with that one of REPEDs 105. At this point, power to the control pair 110 is turned off by the REPED control unit 202, if the REPED control unit 202 has no other action to perform on this control pair 110, or a power down command is issued, such that the next one of the REPEDs 105 desired to be activated will gain the control pair 110.

A REPED session begins when a control pair 110 from a REPED controller 202 is activated by applying a 40 mA current source across the control pair 110. Following is a detailed description of the contention circuit of FIGS. 7A-D that performs contention resolution in each of the REPEDs 105. The end result of contention is that the control pair 110 belongs to one and only one of the REPEDs 105.

The contention circuit of FIGS. 7A-D comprises a power supply U14 and associated circuitry, a voltage threshold detector U28A and associated circuitry, a current threshold detector U28C and associated circuitry, a clock oscillator U28B and associated circuitry, a contention sequence PAL U26 and associated buffer converters, a dummy load switch Q6, a power on switch Q4, and a turn off detector U28D.

Operation of the contention circuit of FIGS. 7A-D may be understood with reference to the timing diagrams of FIGS. 8A-B and 9A-B. When voltage initially appears across the control pair 110 from the REPED control unit 202 as a result of the 40 mA current source, it is rectified by a diode bridge BR1 and applied as an input to the power supply U14 as well as to the voltage threshold detector U28A. The power supply U14 becomes operational after approximately one second, supplying 5 V to the contention circuit.

The voltage threshold detector U28A waits for the voltage across the control pair 110 to exceed 70 V. Since none of the REPEDs 105 is active, and the contention circuit draws less than 500 uA of current, the voltage across the control pair 110 rises rapidly to this point in response to the 40 mA current. When 70 V is reached, the signal 70 V_thresh is activated. This signals the contention sequence PAL U26 to start timing as illustrated in FIGS. 8A-B and 9A-B. The contention sequence PAL U26 timer includes a 4-bit counter driven by the signal 35 msec_clk. The period of the signal 35 msec_clk is approximately 35 msec and is intended to vary from unit to unit. The counter counts up to 16 when sample point 1 on the timing diagrams is reached. Once sample point 1 is reached, and assuming that signal 70 V_thresh is still active, the signal sink_on is activated, which energizes a current sink device to sink the 40 mA of current from the REPED control unit 202.

The current sink device comprises dummy load switch Q6 and load resistor R48. Turning on load switch Q6 draws essentially full control pair current through resistor R48, dropping the control pair voltage to approximately 30–40 V. This is enough voltage to maintain the operation of the power supplies U14 in each of the REPEDs 105, but the voltage threshold detectors U28A in each of the REPEDs 105 will no longer be active. This is shown for the winning contender REPED in FIG. 8A. During this initial count to 16, the voltage threhold detector U28A must continuously indicate a control pair voltage above 70 V. Should the voltage drop below 70 V for at least 35 msec, the counter is reset, as indicated in FIG. 8B for the losing contender REPED. It should be noted that in the timing diagram of FIG. 8B, loss of 70 V detection in the losing contender REPED was caused by the current sink of the line by the winning contender REPED.

It is most likely that only one of the REPEDs 105 will reach sample point i and make the state transition from counting to turning on the dummy load switch Q6. Once a REPED 105 turns on its dummy load switch Q6, the voltage threshold detectors U28A in the other REPEDs 105 will reset their respective counters, thereby effectively preventing the other REPEDs 105 from seizing the control pair 110. There is, however, a window of time in which two of the REPEDs 105 can turn on their respective dummy load switches Q6 without shutting out any of the remaining REPEDs 105. This window of time i s illustrated in FIGS. 9A-B.

Figure 9A:
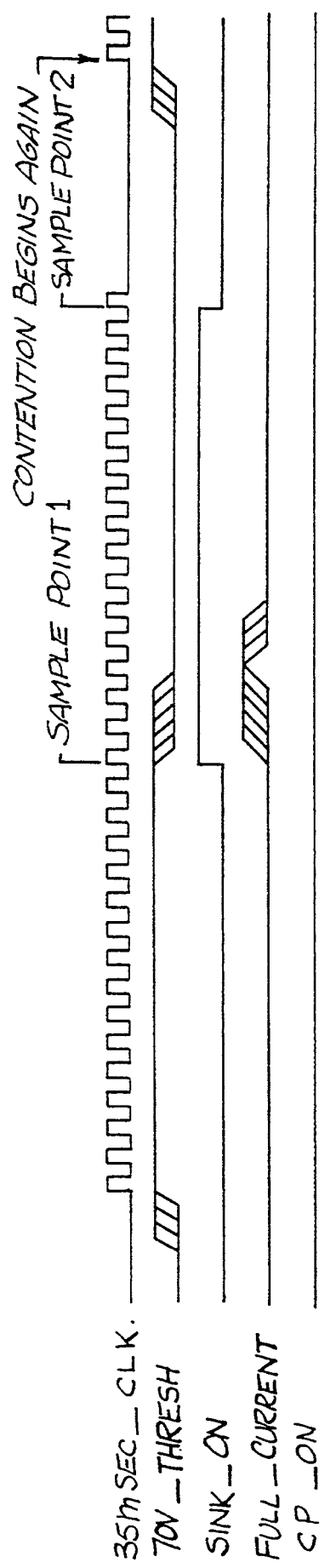
FIGS. 9A–B are timing diagrams of signals associated with the feeder pair contention circuit of FIGS. 7A–D, illustrating the way in which contention between the REPEDs of FIG. 1 is resolved at a second sample point in time.
Figure 9B:
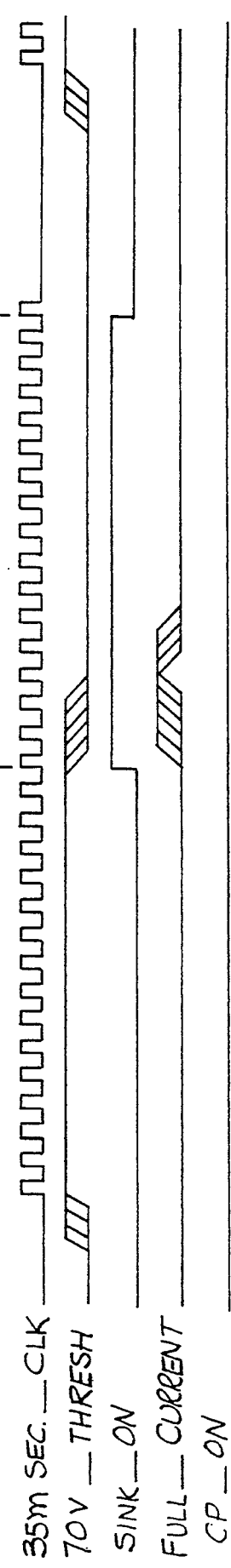

When a REPED 105 turns on its dummy load switch Q6, the contention sequence PAL U26 is enabled to count up to sample point 2 (16 ticks of 35 msec_clk). At the end of this count, the state of a signal full_current, the output of the current threshold detector U28C, is queried. If more than 20 mA of control pair current is flowing through this one of REPEDs 105, it is assumed that the control pair 110 belongs to this one of REPEDs 105. The dummy load switch Q6 is turned off and the signal CP_on is activated, thereby turning on power switch Q4 and enabling this now active one of REPEDs 105. This is the case for the winning contender REPED illustrated in FIG. 8A. If, however, the current threshold detector U28C indicates that 20 mA or less is flowing, another one of the REPEDs 105 must also be on the line. In this case, the contention sequence PAL U26 will reset (de-assert the sink_on signal) and restart the contention sequence from the beginning, waiting for the 70 V_thresh signal to be active from the voltage threshold detector U28A. This is the case for the losing contenders in FIGS. 9A-B. The condition indicated in FIGS. 9A-B represents a worst case scenario when both losing contender REPEDs reach sample point 2 at the same time. Should it have been the case that either contender REPED had reached sample point 2 earlier, the earlier one would have dropped the control pair 110, since it did not have full current, and the later one to reach sample point 2 would gain the control pair 110 because its full_current signal would now be active.

In theory, contention of the type described above may go on indefinitely, with two or more of the REPEDs 105 activating the signal sink_on and determining 16 clocks later they do not have control of the control pair 110. In practice, however, the timing of the different REPEDs 105 will drift apart such that at some sample point 2 in the future only one of the REPEDs 105 will have control of the control_pair 110. That drift need only be a small fraction of the 35 msec_clk cycle to produce enough timing difference so that the sample points of the different ones of REPEDs 105 are distinct instead of coincident.

We claim:

1. A remotely controlled telephone system terminal box for providing non-blocking connectivity between any selected unassigned pair of a plurality X of distribution pairs of lines and any selected pair of a plurality Y of drop pairs of lines, the terminal box comprising:

a switching matrix comprising a plurality X of distribution switch blocks, each one of said plurality X of distribution switch blocks including a rotary contact arm having a pair off shorting contacts thereon, each one of said plurality X of distribution switch blocks further including a stationary printed circuit board having a pair of contact rings connected to an associated one of said plurality X of distribution pairs of lines and having a plurality Y of pairs of drop contact pads connected to associated ones of said plurality Y of drop pairs of lines, each one of said plurality X of distribution switch blocks comprising a rotating stepper motor coupled to said rotary contact arm for incrementally moving said rotary contact arm with respect to said plurality Y of pairs of drop contact pads such that electrical contact is made between the associated one of said plurality X of distribution pairs of lines and a selected one of said plurality Y of drop pairs of lines; and control circuit means coupling said switching matrix to a remotely located central office controller for selectively actuating said plurality X of distribution switch blocks in response to commands from said central office controller.

2. A remotely controlled telephone system terminal box as in claim 1 wherein:

said pair of contact rings and said plurality Y of pairs of drop contact pads are arranged as four separate concentric circles on said stationary printed circuit board; and said rotating stepper motor is operative for incrementally moving said rotary contact arm into position proximate a selected pair of said plurality Y of pairs of drop contact pads such that one of said pair of shorting contacts of said rotary contact arm makes electrical connection between one of said pair of contact rings and one pad of the selected pair of drop contact pads and the other one of said pair of shorting contacts of said rotary contact arm makes electrical connection between the other one of said pair of contact rings and the other pad of the selected pair of drop contact pads.

3. A remotely controlled telephone system terminal box as in claim 1 further comprising:

continuity test circuit means, responsive to commands from said central office controller, for verifying that electrical contact is made between the associated one of said plurality X of distribution pairs of lines and the selected one of said plurality Y of drop pairs of lines.

4. A remotely controlled telephone distribution network comprising:

a plurality of terminal boxes, each of the terminal boxes providing non-blocking connectivity between any selected unassigned pair of a plurality X of distribution pairs of lines and any selected pair of a plurality Y of drop pairs of lines, each of the terminal boxes comprising a switching matrix comprising a plurality X of distribution switch blocks, each one of said plurality X of distribution switch blocks including a rotary contact arm having a pair of shorting contacts thereon, each one of said plurality X of distribution switch blocks further including a stationary printed circuit board having a pair of contact rings connected to an associated one of said plurality X of distribution pairs of lines and having a plurality Y of pairs of drop contact pads connected to associated ones of said plurality Y of drop pairs of lines, each one of said plurality X of distribution switch blocks comprising a rotating stepper motor coupled to said rotary contact arm for incrementally moving said rotary contact arm with respect to said plurality Y of pairs of drop contact pads such that electrical contact is made between the associated one of said plurality X of distribution pairs of lines and a selected one of said plurality Y of drop pairs of lines; and a single control pair of lines coupling each one of the plurality of terminal boxes of the distribution network to a remotely located central office controller, the single control pair of lines being operative for conveying operating power and control commands from the central office controller to the plurality of terminal boxes;

each one of the plurality of terminal boxes including a control pair contention circuit, coupled to said single control pair of lines, each control pair contention circuit being responsive to energization of the single control pair of lines for causing a selected one of the plurality of terminal boxes of the distribution network to become active and for causing the other terminal boxes of the distribution network to become inactive;

each one of the plurality of terminal boxes including control circuit means, the control circuit means of the active one of the plurality of terminal boxes being responsive to commands from said central office controller for selectively actuating the plurality X of distribution switch blocks of that active terminal box.

5. A process for providing non-blocking connectivity between any selected unassigned pair of a plurality X of distribution pairs of lines and any selected pair of a plurality Y of drop pairs of lines, the process comprising:

providing a switching matrix comprising a plurality X of distribution switch blocks, each one of said plurality X of distribution switch blocks including a rotary contact arm having a pair of shorting contacts thereon, each one of said plurality X of distribution switch blocks further including a stationary printed circuit board having a pair of contact rings connected to an associated one of said plurality X of distribution pairs of lines and having a plurality Y of pairs of drop contact pads connected to associated ones of said plurality Y of drop pairs of lines, each one of said plurality X of distribution switch blocks further including a rotating stepper motor coupled to said rotary contact arm for incrementally moving said rotary contact arm with respect to said plurality Y of pairs of drop contact pads;

providing a control circuit coupling said switching matrix to a remotely located central office controller for selectively actuating said plurality X of distribution switch blocks in response to commands from the central office controller; and issuing one or more commands from the central office controller to selectively actuate the plurality X of distribution switch blocks of said switching matrix to thereby cause electrical contact to be made between the associated one of said plurality X of distribution pairs of lines and a selected one of said plurality Y of drop pairs of lines.

6. A process as in claim 5 further comprising the step of issuing one or more continuity test commands from the central office controller for verifying that electrical contact is made between the associated one of said plurality X of distribution pairs of lines and the selected one of said plurality Y of drop pairs of lines.

* * * * *